United States Patent [19]

Binzen et al.

[11] Patent Number: 4,714,097
[45] Date of Patent: Dec. 22, 1987

[54] DUST CONTAINMENT SYSTEM FOR BULK CARGO CONTAINERS

[75] Inventors: Willard Binzen, Gibsonia, Pa.; Robert S. Catan, Greenlawn, N.Y.

[73] Assignee: Dravo Corporation, Pittsburgh, Pa.

[21] Appl. No.: 918,537

[22] Filed: Oct. 14, 1986

[51] Int. Cl.⁴ .............................................. B65B 1/04
[52] U.S. Cl. .......................................... 141/5; 141/93; 55/473; 55/DIG. 29; 98/36; 414/291
[58] Field of Search ................. 414/291; 55/467, 473, 55/DIG. 29, 385 A; 98/36, 115.4; 141/1–12, 93, 98

[56] References Cited

U.S. PATENT DOCUMENTS

| | | | |
|---|---|---|---|
| 1,800,583 | 4/1931 | Wolf | 55/DIG. 29 |
| 2,074,317 | 3/1937 | Allan et al. | 98/36 |
| 3,585,919 | 6/1971 | Culpepper | 98/36 |
| 3,592,121 | 7/1971 | Lundy | 98/36 |
| 3,707,998 | 1/1973 | Dalrymple | 141/93 |
| 3,722,397 | 3/1973 | Kempthorne | 98/115 R |
| 3,739,893 | 6/1973 | Kaufmann | 193/17 |
| 3,760,446 | 9/1973 | Payton | 98/36 |
| 3,843,461 | 10/1974 | Allen | 55/DIG. 29 |
| 3,844,205 | 10/1974 | Watanabe | 98/115 R |
| 3,867,969 | 2/1975 | Garnett | 141/59 |
| 3,908,720 | 9/1975 | Garnett | 141/93 |
| 3,909,223 | 9/1975 | Schmidt | 55/467 |
| 3,980,008 | 9/1976 | Martin et al. | 98/115.4 |
| 3,994,210 | 11/1976 | Davis | 98/115 R |
| 4,061,221 | 12/1977 | Higashinaka | 141/93 |
| 4,095,625 | 6/1978 | Marpe | 141/93 |
| 4,247,370 | 1/1981 | Nijhawan et al. | 98/115.4 |
| 4,427,427 | 1/1984 | DeVecchi | 55/DIG. 29 |

Primary Examiner—Houston S. Bell, Jr.
Attorney, Agent, or Firm—Parmelee, Miller, Welsh & Kratz

[57] ABSTRACT

A method and apparatus for the containment of dust within a bulk cargo container such as a ship or barge hold. A horizontal stream of ambient air is directed across the hatch opening by a plurality of interconnected air curtain modules which captures fugitive dust along its path. A plurality of interconnected dust collector modules withdraw the entrained dust particles at an opposite side of the hatch opening and exhaust the filtered air stream therefrom and deposit the filter cake back into the hold. The clean exhaust air from the dust collector modules may be used to form a vertical air curtain to deflect crosswinds.

15 Claims, 9 Drawing Figures

DUST CONTAINMENT SYSTEM FOR BULK CARGO CONTAINERS

BACKGROUND OF THE INVENTION

The present invention relates generally to the control of air borne particulate matter and, more particularly, to the containment and capture of dust laden air within large confined spaces, such as, for example, cargo holds in ships, barges, bulk silos, and the like.

In ship loading and unloading operations involving granular or powder-like bulk cargos, such as, for example, cement, phosphate, lime, to name a few, dust laden air escapes periodically from the cargo hold and may be blown considerable distances into the surrounding environment. Such fugitive dust creates serious air pollution problems in most urban port locations and must be abated if the enterprise is to continue in operation. The vast size of the cargo holds in ships and the variables created by their differing dimensional openings and the influence of crosswinds, cause problems for cargo terminals in providing any type of dependable dust abatement equipment to control this ever present problem. Various approaches have been proposed in an attempt to control certain specific dust problems during ship loading operations, such as in grain loading operations, by providing a vacuum within a discharge conduit in the ship's hold, or by surrounding the loading chuts as shown in U.S. Pat. Nos. 3,739,893 and 3,867,969, respectively. It is also known to enclose a rather small and well defined loading area adjacent a hopper through the use of air stream and dust collection suction devices, as depicted in U.S. Pat. Nos. 3,909,223 and 3,908,720. While these devices are said to be satisfactory in controlling localized dust problems occurring at a specific location, they are not suitable for the capture of dust laden air which may be escaping in other portions of the cargo hold. These prior systems prove futile in capturing fugitive dust in the large open areas, such as ship holds, because the influence of these conventional dust control systems is vary limited to those areas immediately adjacent to the pick-up points. Since the ship's hold areas must be free and clear of obstacles to allow unloading booms and equipment to operate, any hold covers or enclosures and/or multiple dust pick-up points, along with the required air capacity for practical dust capture at these points, is either not feasible or is uneconomical.

SUMMARY OF THE INVENTION

The present invention provides a dust containment system for bulk cargo containers which is particularly suitable for use in shipboard loading and unloading operations. The invention provides one or more air curtain modules and one or more dust collection modules which are placed on opposed sides of an open hatch above the bulk cargo hold. The modular construction of the air curtain and dust collection units permits fast assembly of units at dockside so as to accommodate hatch openings of various dimensions. The air curtain modules supply continuous streams of ambient air across the top of the open hatch and form a horizontal air curtain which prevents particulate matter from escaping from the hold into the surrounding environment. The fugitive dust which is entrained within the air stream supplied by the air curtain modules is captured by a negative draft generated by the dust collection modules on the opposite side of the hatch opening. The dust collection modules are of a self-cleaning type which dislodge the collected dust cake from the filler media and deposit it directly back into the ship's cargo hold.

The present invention further provides a vertical air curtain along the array of dust collection modules to deflect any crosswinds which may blow over the open hatch and disrupt the efficiency of the aforementioned horizontal air curtain. The vertical air curtain is generated by the dust collector fans which exhaust the filtered ambient air through a plurality of vertically extending divergently shaped exhaust ducts. This secondary exhaust air curtain reduces the updraft influences of crosswinds which might otherwise diminish the effectiveness of the horizontal air curtain across the cargo hold.

The invention thus provides a horizontal air curtain for containing the dust which permits full visual access of the cargo hold by the equipment operators and also permits the ship unloader/loader boom to work and move through the air curtain without affecting its dust containment functions. The dust collection modules and air curtain modules may be moved from hold to hold easily by a ship's crane or by a hoist carried by the loader/unloader equipment. The modules are picked-up as an entire span and quickly moved to the next hold to be loaded or unloaded. The modules containing the individual dust collection units and the air curtain fan units are constructed in a truss span configuration such that each module unit is one of two standard unit lengths. One of the module units may contain, for example, three dust collection devices, while a smaller module unit may contain one dust collection device. Empty module units, containing no dust collector may also be employed in the span to space the active collector modules and serve as a filler module in a given open hatch dimension, if needed. The ends of each module unit are equipped with overlapping, apertured webs which are pinned together to provide a rapid connect and disconnect capability when assembling and disassembling a span of module units to fit a particular hatch opening dimension.

The invention further provides various hanger means for supporting the span of modules across the hatch opening. One such arrangement utilizes outrigger end sections which are fitted with load spreader bars for placement across the beam dimension of the hatch which rests on the hatch cover rail. Optionally, these outrigger sections may be fitted with wheeled trucks to ride the same rails as the hatch cover. This arrangement provides for an air curtain/dust collector arrangement which can be moved along the hatch opening and, in so doing, extra long hatches can be unloaded with minimum equipment by partially closing the hatches and working one end then moving to the other and by rolling the hatch cover and the air curtain modules and dust collector modules along the rails. The air curtain and dust collector modules of the present invention are also adapted to be hung on the hatch combining in the fore-/aft dimension, if desired.

Briefly stated, the present invention provides a method and apparatus for the containment of dust within a cargo container comprising a plurality of interconnected dust collector modules spanning one side or end of a bulk cargo container opening and a plurality of interconnected air curtain modules spanning an opposite side or end of the opening. The air curtain modules include fans which generate a large diameter, primary air stream which, in turn generates a secondary air stream which gradually diverges along its path to merge with adjacent streams across the width of the opening. The air curtain traverses the top of the hold opening in a horizontal plane and captures fugitive dust along its path. The entrained dust particles are then withdrawn from the air curtain at the opposite side of the hold opening by the dust collector units. The modular units are pinned together at their adjacent ends to provide for quick assembly and disassembly in order to permit the fitting of various sized hatch openings in a time efficient manner. The dust collection modules are equipped with conventional, compressed air backflow devices which periodically clean the filters contained therein allowing the captured particulate material in the form of a dust cake to fall by gravity from the modules and return to the cargo hold. The dust collector modules also preferably include divergent, vertically extending exhaust ducts at the tops thereof to direct the filtered ambient exhaust air in a vertical plane along the line of the modules in order to form a vertically extending air curtain to deflect crosswinds which may otherwise affect the functioning of the horizontal air curtain across the cargo hold. Various attachment means are provided at the ends of the modules to permit the attachment thereof to the cargo hatches.

BRIEF DESCRIPTION OF THE DRAWINGS

Other objects and advantages of the present invention will become readily apparent upon reference to the accompanying description when taken in conjunction with the following drawings wherein.

DETAILED DESCRIPTION OF THE INVENTION

Figure 1:
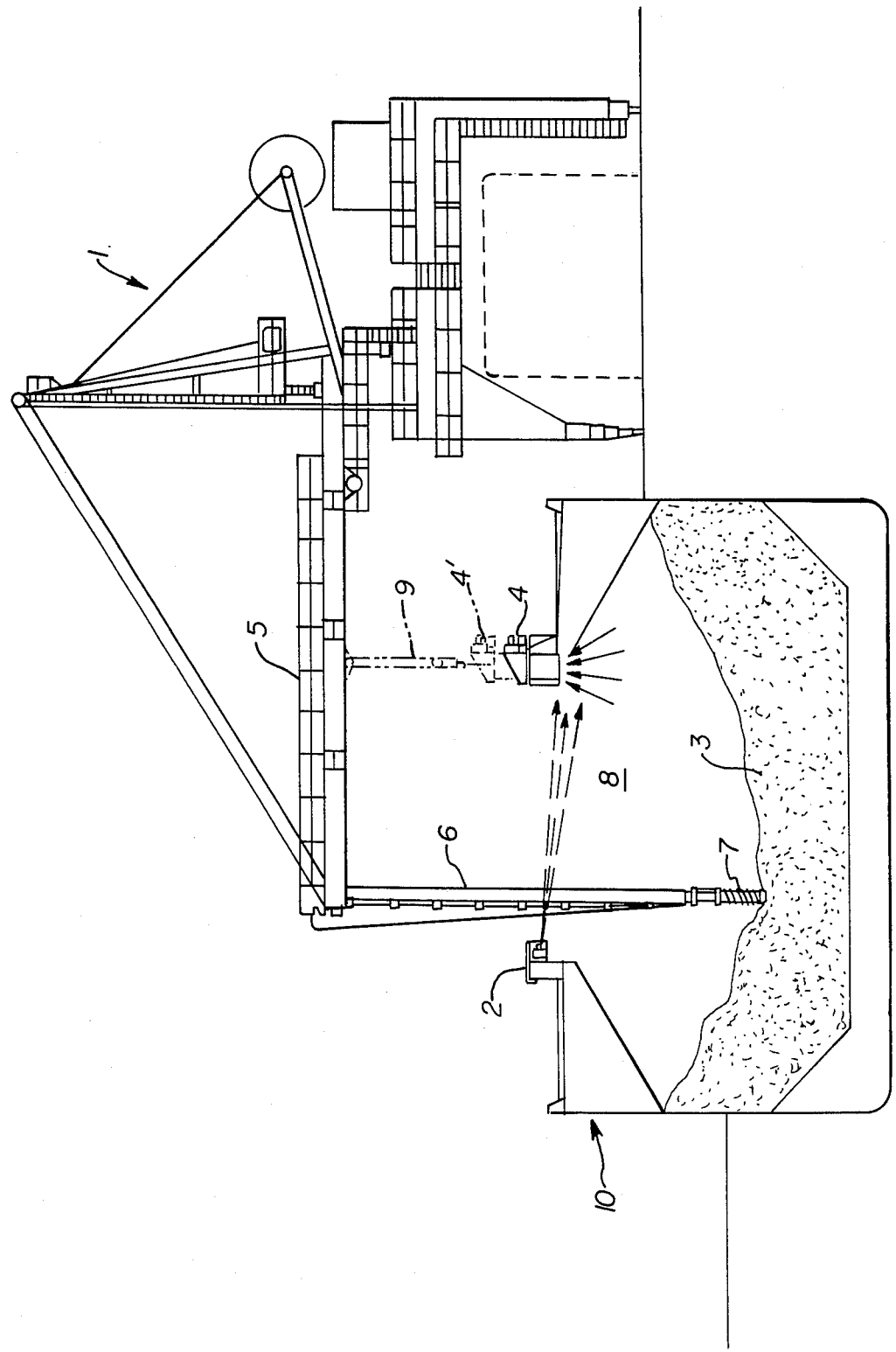
FIG. 1 is a side elevation view of a ship unloader alongside a ship having the dust containment system of the present invention in place thereon.

Referring to the drawings, wherein like reference numerals indicate the same parts throughout the various views, FIG. 1 depicts the dust containment system of the present invention in place onboard a bulk cargo vessel 10, which is moored alongside a conventional dock mounted, ship unloader 1. The ship unloader 1 is of the enclosed screw-type which minimizes dust contamination during the take-away operation. The unloader 1 includes a horizontal arm portion 5, pivotally connected to a vertical arm 6 which carries a digging head 7 at the end thereof. The ship 10 has an open cargo hold 8 which contains a particulate bulk cargo 3 therein. Typically, the cargo 3 with which the invention finds application is of a dusty nature such as cement, phosphate, lime, bauxite and other ores, coal, grain and like particulate materials. As the digging head 7 of the ship unloader conveys the cargo upwardly through the arm 6, large depressions are continuously formed in the bulk cargo mass 3 which periodically results in cave-ins. These cave-ins generate large clouds of fugitive dust within the open interior of the hold 8. Crosswinds above the open area of the hold 8 generally cause a draft to circulate within the hold which provides a vehicle for the fugitive dust cloud to escape into the surrounding atmosphere.

In addition to the cloud-like emissions which occur during the unloading operation caused by pile collapse, a dust emission problem is also present when the majority of the cargo 3 has been unloaded and final clean-up of the hold 8 is underway. In such clean-up operations, it is necessary for workers with power shovels and brooms to enter into the cargo hold 8 in order to remove the last remaining bulk product therefrom. This operation not only generates additional dust laden air but also creates a very unpleasant working environment for the clean-up crews.

In order to alleviate these dust emission problems, the ship 10 of FIG. 1 is fitted with a plurality of interconnected air curtain modules 2 on one side of the hatch of the cargo hold 8 which creates a horizontally extending curtain of air thereacross. Positioned on the opposite top side of the hatch are a plurality of interconnected dust collector modules 4 which generate a negative draft to draw the air curtain and entrained dust particles therein. Each of the dust collector units within the modules 4 have a plurality of fabric filter elements positioned below the fans for trapping fugitive dust particles and thus prevent their escape into the atmosphere. Periodic back flushing of the dust filters by pulsed compressed air cleans the filters and returns the dust cake back to the hold 8 of the ship for later recovery. The details of construction and operation of the air curtain modules 2 and the dust collector modules 4 will be explained in greater detail hereinafter. The units 2 and 4 also carry attachment means so as to permit them to be mounted on opposite sides of the open hatch above the hold 8 of a ship and their modular construction permits them to be easily moved from one ship hatch to another when the loader/unloader moves from hold to hold. The entire span of collector modules 4 and air curtain modules 2 are picked up by the ship's hoist equipment or by a hoist 9 on the unloader, shown in phantom lines in FIG. 1 lifting a span of dust collector modules 4'.

Figure 2:
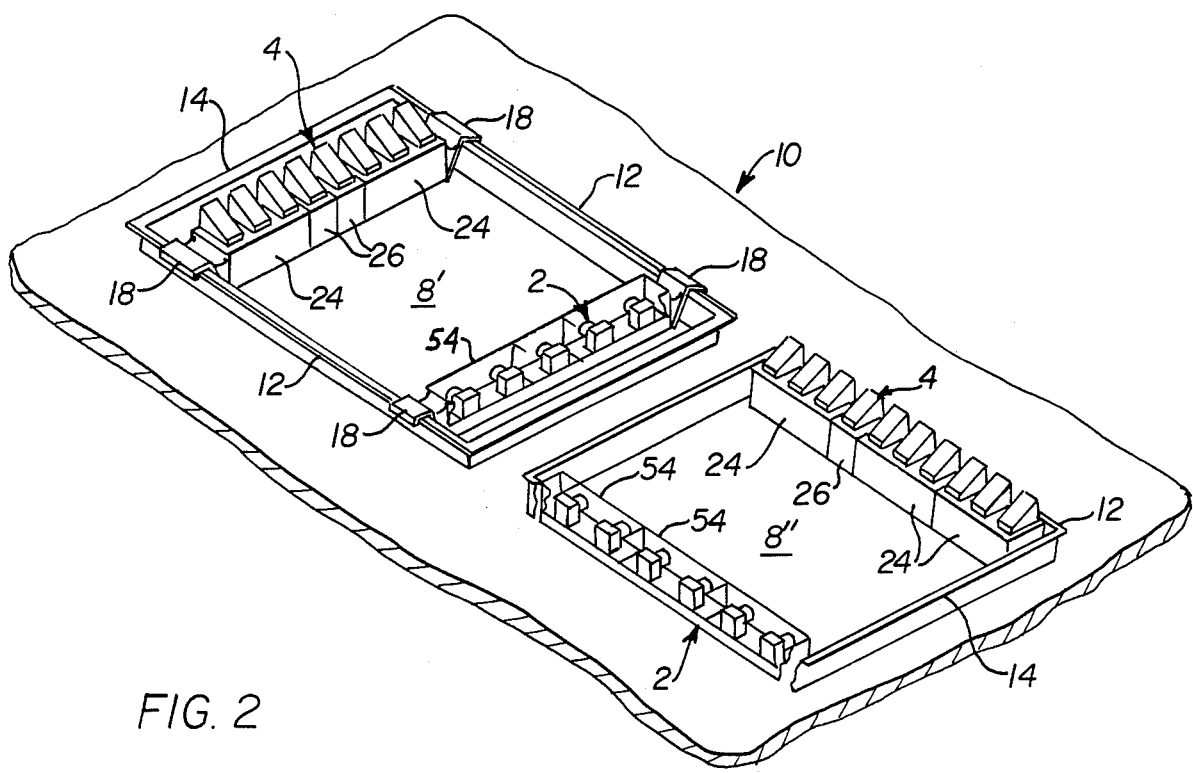
FIG. 2 is a partially fragmented, perspective view of two cargo hatches showing several arrangements of the present invention in place thereon.
Figure 6:
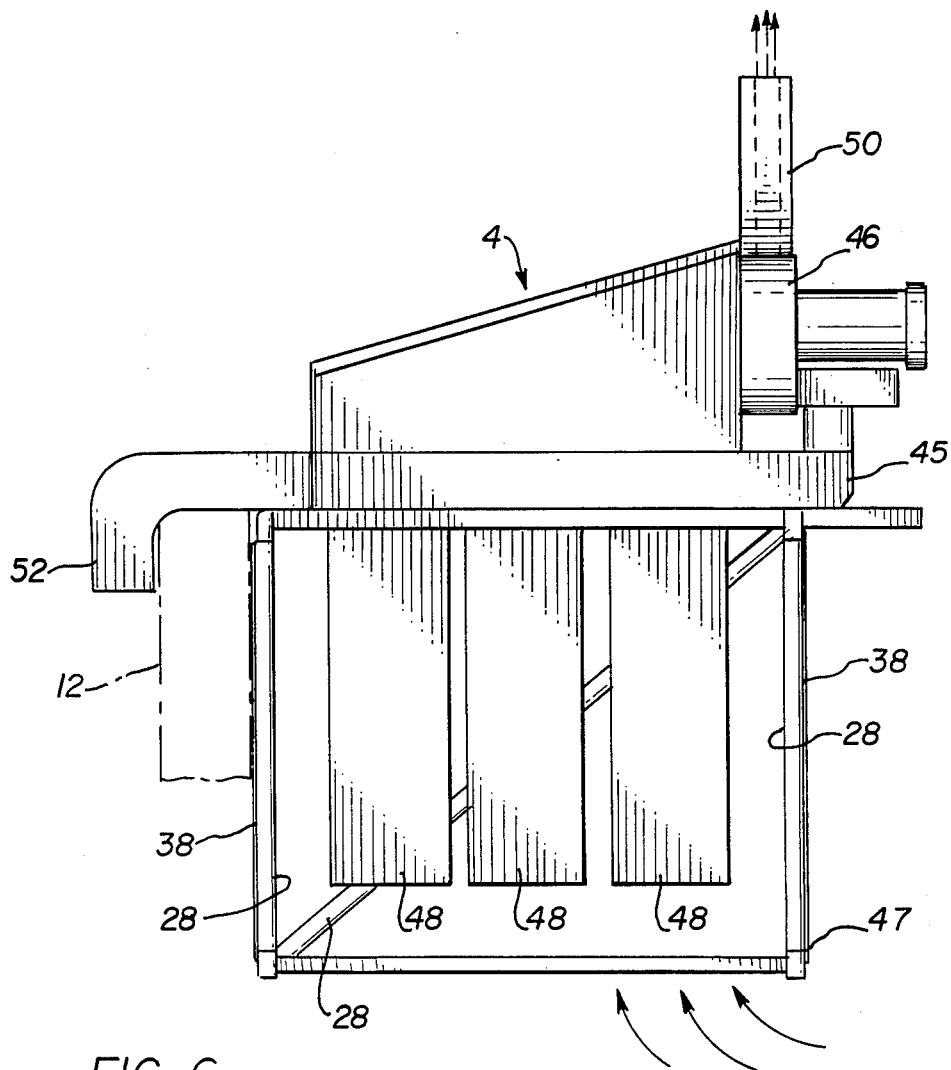
FIG. 6 is a side view of a dust collector unit taken along line VI—VI of FIG. 4.
Figure 9:
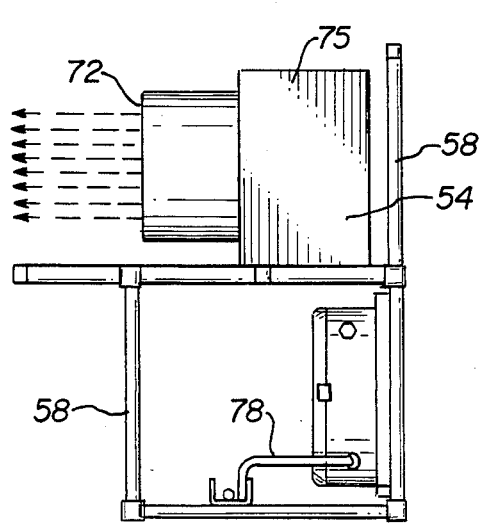
FIG. 9 is a side view of an air curtain module taken along line IX—IX of FIG. 7.

As shown in FIG. 2, the air curtain modules 2 and dust collection modules 4 may be positioned on opposed ends or opposed sides of the hatch opening. The cargo hold 8' depicts the air curtain modules 2 and the dust collection modules 4 spanning the hold in the beam direction 14 such that the terminal ends of the modules are attached to each hatch combing 12 by way of hanger elements 18. The equipment arrangement in conjunction with cargo hold 8" of FIG. 2, shows the dust collector modules 4 and the air curtain modules 2 extending in the fore-aft direction, hanging along the hatch combing 12 on opposite sides of the hatch opening. A plurality of right angle hangers 52, show in FIG. 6, are suitable for supporting the fore-aft arrangement placed along the hatch combing 12. Should a terminal operation favor one arrangement over the other, i.e., spanning the hold as in 8' or running the length of the hatch combings 12 as in hold 8", the modular units 2 and 4 are easily moved by a hoist or crane to one or the other preferred configurations so as to best satisfy the prevailing wind conditions and the preferences of the equipment operator.

The hatch openings of each cargo vessel will vary in physical dimensions from vessel to vessel and the modular construction of the present invention is particularly suited to accommodate such variable hatch dimensions. For example, typical hatch dimensions may vary from a small hatch size of 32 feet wide by 39 feet long to a large-hatch of 46 feet wide by 66 feet long. The dust collection modules 4, as well as the air curtain modules 2, are assembled together in various modular unit combinations which are joined quickly by pinned connections to fit a variety of required hatch dimensions. Once a particular hatch opening dimension is determined, the basic modular units are assembled to fit the span. As previously stated, the air curtain and dust collector modules 2 and 4 may extend across the beam dimension of the hold or span the foreaft dimension, whichever is most advantagous to the loading/unloading operation. A span arrangement across the width of the hatch may be considered advantageous in some terminal operations because there is no need to reach across the entire hatch opening to place the span of modules on the far hatch combing 12.

Figure 3:
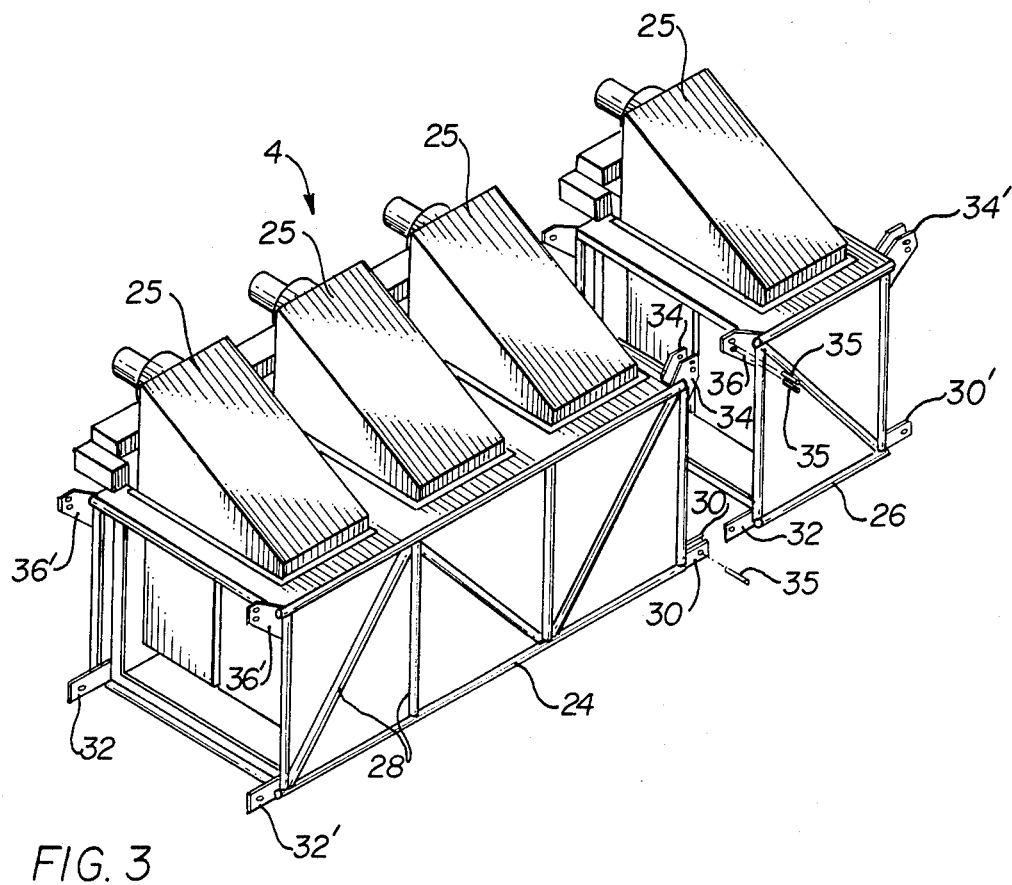
FIG. 3 is a perspective view of two dust collection modules of the present invention.
Figure 4:
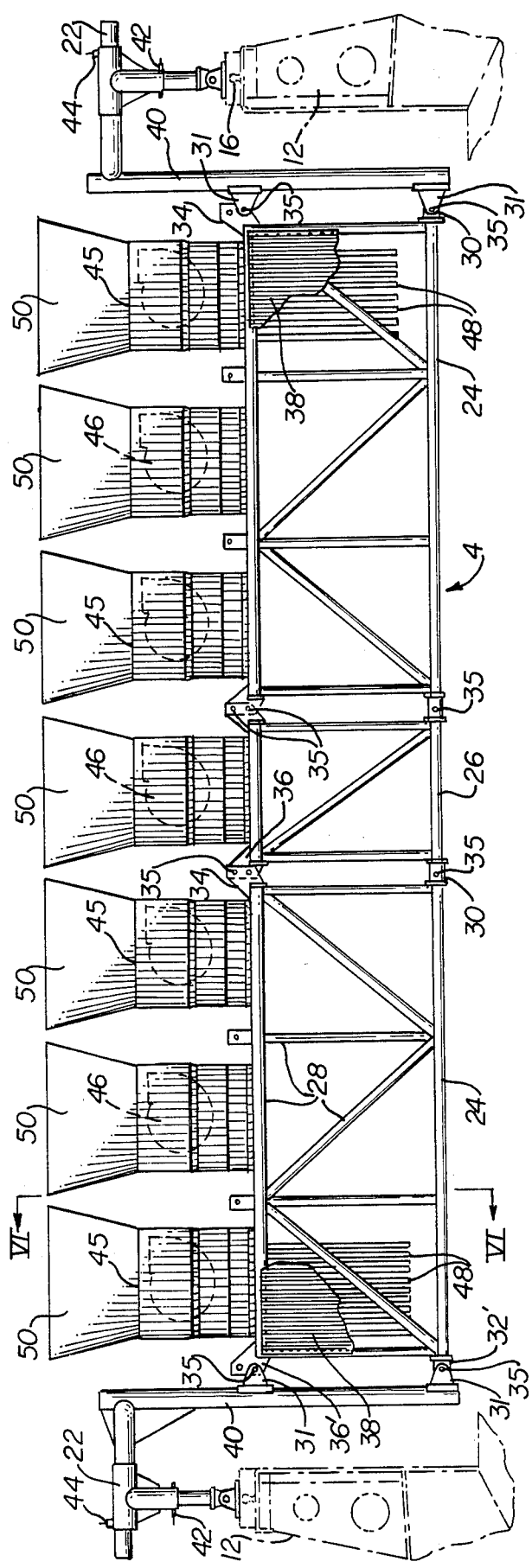
FIG. 4 is a longitudinal side view of a span of dust collection modules positioned across the hold of a ship.
Figure 5:
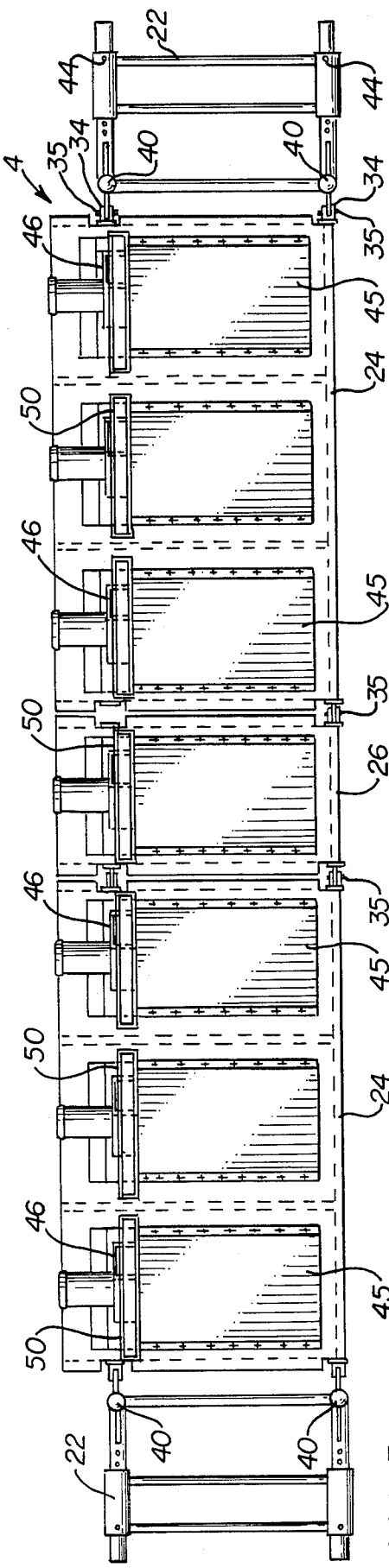
FIG. 5 is a plan view of the dust collection modules of FIG. 4.

As seen in FIGS. 3-5 the individual module unit making-up a span of modules 4 are of two standard length dimensions, for example, a three-unit module 24 and a single-unit module 26 are shown in FIG. 3. The module 24 contains three identical dust collector devices 25 while the module 26 contains one dust collector device 25 therein. In practice, the three-unit module 24 is about fifteen feet in spanning length while the single-unit module 26 is about five feet in length. The modular units 24 and 26 are framed within a plurality of structural elements 28 of steel and/or aluminum angles to form a rigid, truss span structure, in the nature of a bridge span, to support the weight of the dust collector devices 25 therein. The abutting ends of the modular units 24 and 26 carry outwardly extending, apertured webs 30 and 32 which overlappingly mate at the bottom of the units. Similar webs 34 and 36 engage in an identical manner at the top portion of the units 24 and 26. Tapered pins 35 are driven through the apertures in the webs 30, 32, 34 and 36 to secure the units 24 and 26 together. The secured modular units are shown in FIGS. 4-8. Of course, other fasteners such as threaded bolts and nuts could be employed but are more labor intense, than tapered pins 35. The outwardly extending apertured webs 32' and 36' shown on the unit 24 and webs 30' and 34' of unit 26 in FIG. 3, are adapted to be attached to complementary overlapping webs on an adjacent modular unit (not shown). In making- up a span of module units to fit a particular dimensional hatch opening, a variety of combinations utilizing the modular units 24 and 26 can be employed. For example, in the dust collection modules 4 of FIGS. 4 and 5, two three-unit modules 24 are employed along with a centrally disposed single-unit module 26. Based on the fifteen and five feet spanning lengths of the respective modules 24 and 26, this arrangement forms a span of about thirty-five feet in length. Another spanning arrangement shown in FIG. 2 utilizes two, three-unit modules 24 and two single modules 26 providing a span length of about forty feet across the dimension 14 of hold 8'. A still further arrangement in connection with the hold 8" of FIG. 2, utilizes three of the three-unit modules 24 and one single module 26 to provide a span length of about fifty feet.

A pair of fixed outrigger support arms 22 of FIGS. 4 and 5 are employed to support the span of modules 4 on the hatch combing 12 above the hatch rail 16. Each support arm 22 includes a pair of spaced-apart, vertically extending elements 40 which carry apertured attachment webs 31 thereon. Webs 31 are vertically spaced and outwardly extend from elements 40 to matingly engage the adjacent webs 30, 32', 34 and 36' on the dust collector modules 24 and are securely fastened together by way of tapered pins 35. The outrigger support arms 22 also include horizontal adjustment pins 44 and vertical adjustment pins 42 to permit final alignment adjustments relative to the hatch combing 12.

As stated above, dust collector modules 24 and 26 each contain one or more conventional, self-contained dust collector units 45 which require no extensive duct. Each collector unit 45 includes an integral fan and motor 46 which induce a draft within the ship's hold 8 to draw the dust laden air toward the filter elements 48, FIGS. 4 and 6. The motors 46 are relatively light duty, on the order of 15 horsepower. Each dust collector filter element 48 consists of a conventional felted fabric pad or similar fabric or material, supported on a rigid mesh frame which prevents the passage of the dust therethrough as the air from the hold is drawn inwardly by the force of the fans 46. A compressed air source is in communication with the interior of each of the filter elements 48 and is periodically activated to back clean the accumulated dust on the outer surfaces of the filter elements 48. When activated, the compressed air causes-the loosened dust cake to fall by gravity back into the cargo hold 8 of the ship 10. A typical, commerical dust collector device 45 is particularly suited for use in the present invention.

As shown in FIGS. 4-6, each of the fans 46 of the dust collector units 45 have a generally diverging exhaust duct 50 mounted at the top thereof to direct the filtered, exhaust air from each fan in an upward direction from the collector 45 units. The combined effect of the plurality of diverging exhaust ducts 50 is to create a vertically extending air curtain above and along the span of the dust collector modules 4, which serves to deflect prevailing crosswinds across the ship's hold so as to minimize the wind's affect on the horizontally extending air stream established by the air curtain modules 2. Thus, it is appreciated that each of the individual dust collector units 45 create a negative draft within the ship's hold to draw in and collect the fugitive dust particles on the filler elements 48 while, at the same time, create a vertical air curtain through the use of the diverging exhaust ducts 50.

Figure 7:
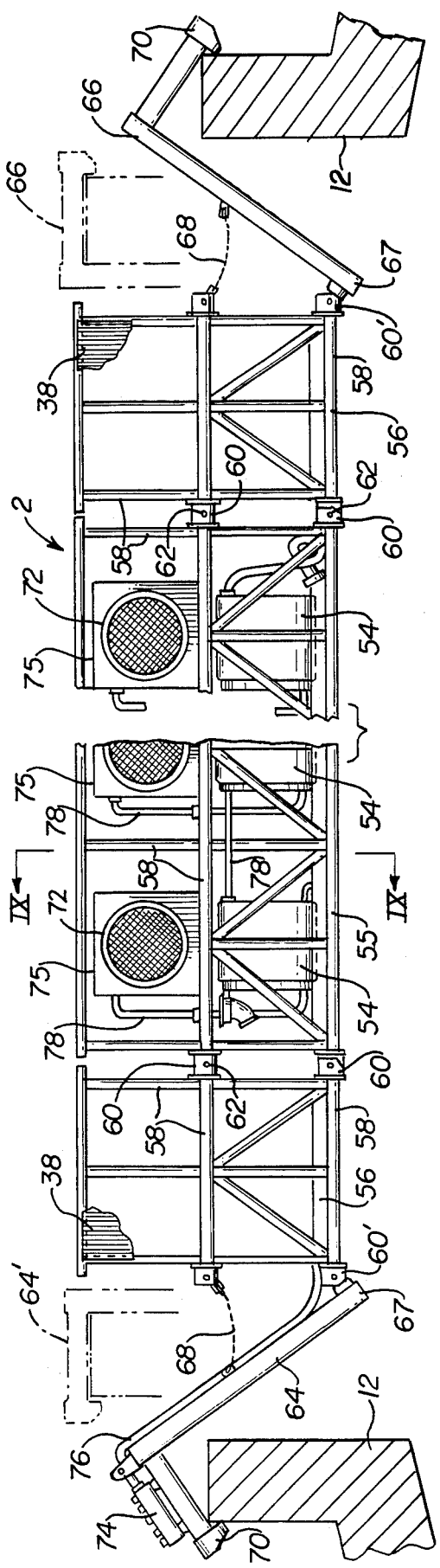
FIG. 7 is a partially fragmented, side elevational view of a span of air curtain modules positioned across a ship's hold.
Figure 8:
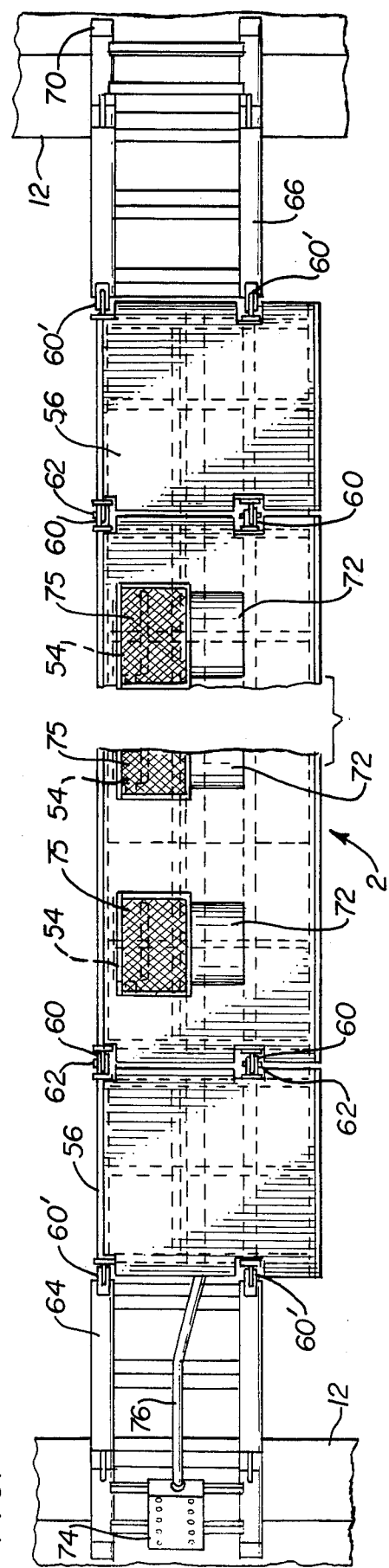
FIG. 8 is a plan view of the span of air curtain modules of FIG. 7.

FIGS. 7 and 8 show the air curtain modules 2 in an assembled array spanning a cargo hold between opposed hatch combing rails 12. Each of the modular units making up the span of air curtain modules 2 may contain one, two, or three individual air curtain fan devices 54. The array making- up the span 2 may also contain one or more filler units 56 as shown in FIGS. 7 and 8 which contain no fan devices. Structurally, the air curtain modular span 2 is constructed in a similar manner as previously described for the dust collector modules 4. A bridge-like truss span construction for each module is framed by a plurality of structural members 58 which also carry outwardly extending webs 60 at respective end portions. The webs 60 interengage like webs on adjacent units which are also secured together by way of tapered pins 62. The air curtain modules 2 of FIGS. 7 and 8 are equipped with pivotal hanger elements 64 and 66 at the terminal ends thereof which are adapted to be attached to the opposed sides of the hatch combing 12. In this equipment configuration, the modular units 2 and 4 span the beam dimension of the hatch opening. Each of the hanger elements of 64 and 66 are constructed in a right angle profile and are pivotally attached at their lower ends 67 to webs 60' carried by the outermost modular unit of the span 2. A flexible tether, such as a chain 68, is attached to the hangers 64 and 66 at their midportions portions at one end and connected to the ends of the modular unit 2 at the other. The tether chains permit the hanger elements 64 and 68 to pivot outwardly such that the gripping portions 70 of the hanger elements are swung laterally a sufficient distance so as to engage the top edges of the hatch combing 12 when the modular unit 2 is lowered into the hatch opening of the hold. The pivotal feature of the hanger elements 64 and 66 also permits the span 2 or 4 to be hung in a hatch opening when the hatch dimension is greater than the length of the span 2, as shown in FIG. 7. The hangers 64 and 68 also pivot inwardly to permit a snug fit within the confines of the hatch, as shown in phantom lines in FIG. 7.

Each of the air curtain units 54 has an electric motor which drives a fan to emit a coherent stream of high velocity ambient air through an outlet duct 72. The ambient air enters each of the air curtain units 54 through a screened inlet duct 74. The air outlet ducts 72 are preferably circular in cross-section and, thus deliver a cylindrically shaped stream of air in a generally horizontal path across the open cargo hold. A primary air stream is emitted from each air curtain unit 54 and is generally laminar in flow and coherent across the hold. This primary stream of air gradually diverges as it moves away from the unit 54 to generally take on a conical shape as it moves across the top of the cargo hold. As the primary air stream traverses the air space it draws with it a secondary air flow which also gradually expands as it moves across the space. These secondary air streams from adjacent units 54 overlap and form the continuous horizontal air curtain across the top of the cargo hold. We have found that a relatively large-sized air outlet duct 72, on the order of about 18 to 36 inches in diameter, creates a coherent air stream which traverses long distances, of 60 feet or more, across the ship's hold without loosing its laminar-like flow characteristics. This primary air flow, along with the secondary, induced air flow surrounding it, creates a large radius of influence which overlaps with adjacent air streams to contain the fugitive dust within the cargo hold 8. We have thus found that a large diameter, coherent air mass may be projected a long distance by utilizing relatively low pressure air streams generated by the air curtain units 54. This is accompanied by utilizing relatively low horsepower fan motors, on the order of between 1 and 3 horsepower, for example. Preferably, the air stream emitted from the outlet duct 72 of each air curtain unit 54 is directed so that a portion of the air stream is aimed to arrive at the duct collector modules 4 slightly underneath the aprons 47 at the front of the collector units 45, as shown in FIG. 1 and FIG. 6. The motors of the individual air curtain fan units 54 also preferably contain a variable speed feature to accommodate different sized cargo holds. The effective velocity of the primary air streams can vary within a relatively broad range, on the order of about 700 feet per minute, upwards to a velocity of 6,500 feet per minute or greater. The secondary air streams which surround the primary streams are effective in entrapping particles of dust at speeds as low as 50 feet per minute which is well within the secondary stream velocities produced. Hence, as the primary and overlapping secondary air streams traverse the open space above the cargo hold, the fugitive clouds of dust laden air are entrapped within the horizontal air streams and conveyed across the top of the cargo hold to be captured by the dust collector module units 4. While a circular-shaped air duct 72 is preferred, other shapes, such as, for example, oval, square or rectangular could be used. Air curtain units 54 suitable for use in conjunction with the present invention are manufactured by Dynaforce Corporation.

The controls for energizing the modular units 2 and 4 may be placed on one of the hanger arms, such as arm 64, as shown in FIGS. 7 and 8. A control box 74 is mounted on an accessible portion of the hanger arm 64 and is electrically connected by conduits 78 to the motors of the air curtain units 54. Electrical power may be supplied to the motors of the air curtain modules 2 and dust collector modules 4 by way of an onshore power line or by a portable generator set (not shown). Compressed air for back cleaning the filter elements 4B of the dust collector units may also be conveniently supplied by a portable air compressor unit.

The individual air curtain module units are also preferably constructed in two lengths as previously described for the dust collection modules. A single unit air curtain module or filler module unit 56 is about five feet in span length while a three-fan module unit, partially shown as unit 55 in FIG. 7, is about 15 feet in length.

As shown in FIGS. 4 and 7, the modules forming the air curtain modules span 2 and those of the dust collector span 4 are preferably enclosed by facing sheets 38, such as, for example, of a light weight fiber reinforced plastic material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A dust containment system for use in loading and unloading bulk cargo containers comprising:
air curtain means including a plurality of interconnected modules adapted to be detachably mounted adjacent an open hatch portion of said cargo container to generate a plurality of substantially horizontally extending, converging streams of air across the top of said hatch portion;
dust collector means comprising a plurality of interconnected modules, adapted to be detachably mounted adjacent said open hatch portion of said cargo container opposite said portion occupied by said air curtain means to generate a negative draft of air within said cargo container, said dust collector means including a plurality of filter elements therein, whereby in operation, said horizontally extending air stream generated by said air curtain means is adapted to capture fugitive dust particles released from said bulk cargo to prevent its escape from said container and the negative draft generated by said dust collector means is adapted to draw in said horizontal air stream and withdraw the fugitive dust particles entrained therein, said dust collector means including means for periodically back cleaning said filter elements, whereby collected particulate falls by gravity from said filter elements into said cargo container for subsequent recovery therein.

2. The dust containment system of claim 1 wherein the air curtain means and the dust collector means each comprises a plurality of modules, each module having a unit length or a multiple unit length, said modules being formed in a trussframed structure having attachment means at opposed end portions which matingly engage like means carried by an adjacent module, whereby a plurality of modules, are adapted to be joined together by said attachment means to form a rigid truss span construction of a given span length for placement on a cargo container having a top hatch dimension compatible with said span length.

3. The dust containment system of claim 2 wherein the attachment means comprises a plurality of apertured webs outwardly extending from the opposed end portions of each module wherein the webs carried by structurally adjacent modules overlap and said apertures on respective overlapping webs coincide, said attachment means further including fastener means for placement within said coincident apertures to secure said adjacent modules together.

4. The dust containment system of claim 3 wherein the fastener means is one of tapered pins or threaded bolts and nuts.

5. The dust containment system of claim 3 wherein the bulk cargo container is a cargo hold of a ship of the type having a hatch combing extending on opposed sides of said cargo hold and said spans of air curtain modules and dust collector modules each have hanger means associated therewith adapted for detachably mounting said spans of modules on said hatch combings.

6. The dust containment system of claim 1 in which the air curtain means comprises a plurality of air curtain modules wherein each module contains at least one fan unit for the generation of a coherent air stream having a laminar-like primary flow pattern as it traverse the top of said container.

7. The dust containment system of claim 6 wherein the air curtain modules are housed in a truss-framed structure having attachment means at opposed end portions which are adapted to matingly engage like means carried by an adjacent module, whereby a plurality of air curtain modules are adapted to be joined together by said attachment means to form a rigid truss span construction of a given span length adapted to fit a specific cargo container top hatch portion dimension.

8. The dust containment system of claim 6 in which the dust collector means includes a plurality of side-by-side dust collector modules, wherein each of said modules contains at least one dust collector device including air filter means and fan means for drawing said air stream therein and filtering said fugitive dust particles therefrom.

9. The dust containment system of claim 8 wherein each of the dust collector devices include exhaust duct means mounted thereon for directing filtered exhaust air from said fan means upwardly whereby said plurality of dust collector modules are adapted to generate a vertically extending air curtain by way of said exhaust duct means which is adapted to form a barrier against wind currents above said cargo container.

10. The dust containment system of claim 9 wherein the bulk cargo container is a cargo hold selected from the group consisting of ships and barges.

11. A method for containing dust-like particulate material within the hold of a bulk cargo container during loading and unloading operations, said method comprising the steps of:
establishing a plurality of spaced-apart, coherent primary air streams at one side of an open hatch of said cargo hold and directing said primary air streams across the top of said cargo hold along a substantially horizontal pathway, each of said primary air streams creating a secondary air stream therearound which gradually diverge, forming a substantially continuous stream of air across the top of the cargo hold;
capturing fugitive, dust-like particulate material and entraining said particulates within said horizontal stream of air;
collecting said horizontal stream of air and said entrained particulate material at an opposite side of said cargo hold from said source of primary air streams;
filtering said entrained particulate material from the horizontal air stream;
exhausting said filtered air stream to the atmosphere; and
returning said collected particulate material to said cargo hold.

12. The method of claim 11 including, in conjunction with said exhausting step, the step of forming a vertically extending air curtain with said filtered exhaust air streams to establish a barrier to minimize a cross-wind influence across said open cargo hatch.

13. The method of claim 11 wherein said primary air stream each have a circular cross-section.

14. The method of claim 13 wherein the primary air streams have an initial diameter of between about 18 to 36 inches.

15. The method of claim 11 wherein the bulk cargo container is a cargo hold selected from the group consisting of ships and barges.

* * * * *